(12) United States Patent
Todeschini et al.

(10) Patent No.: US 11,546,428 B2
(45) Date of Patent: Jan. 3, 2023

(54) MOBILE COMPUTING DEVICE WITH DATA COGNITION SOFTWARE

(71) Applicant: Hand Held Products, Inc., Fort Mill, SC (US)

(72) Inventors: Erik Todeschini, Camillus, NY (US); Robert Michael Hussey, Waxhaw, NC (US); Paul E. Crimm, Fort Mill, SC (US)

(73) Assignee: Hand Held Products, Inc., Charlotte, NC (US)

( * ) Notice: Subject to any disclaimer, the term of this patent is extended or adjusted under 35 U.S.C. 154(b) by 613 days.

(21) Appl. No.: 14/462,801

(22) Filed: Aug. 19, 2014

(65) Prior Publication Data

US 2016/0057230 A1    Feb. 25, 2016

(51) Int. Cl.
| | |
|---|---|
| *H04L 67/125* | (2022.01) |
| *G06K 7/10* | (2006.01) |
| *G06F 3/0482* | (2013.01) |
| *G06F 3/04842* | (2022.01) |
| *G06F 3/0488* | (2022.01) |
| *G06F 9/445* | (2018.01) |
| *H04L 67/50* | (2022.01) |
| *H04L 67/025* | (2022.01) |

(52) U.S. Cl.
CPC ........ *H04L 67/125* (2013.01); *G06F 3/0482* (2013.01); *G06F 3/0488* (2013.01); *G06F 3/04842* (2013.01); *G06F 9/44526* (2013.01); *G06K 7/10712* (2013.01); *H04L 67/025* (2013.01); *H04L 67/535* (2022.05)

(58) Field of Classification Search
CPC .. G06F 3/04815; G06F 3/0487; G06F 3/0482; G06F 3/04842; G06F 3/0488; G06F 9/44526; H04L 67/125; H04L 67/025; H04L 67/22; H04L 67/535; G06K 7/10712

See application file for complete search history.

(56) References Cited

U.S. PATENT DOCUMENTS

| | | | |
|---|---|---|---|
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,708,205 B2 | 5/2010 | Kotlarsky et al. |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

European Extended Search Report for related EP Application No. 15180459.8, dated Jan. 21, 2016, 8 pages.

(Continued)

*Primary Examiner* — Kieu D Vu
*Assistant Examiner* — Blaine T Basom
(74) *Attorney, Agent, or Firm* — Alston & Bird LLP

(57) ABSTRACT

A mobile computing device enabled by a customizable data cognition layer (DCL) software program to convert input information from a variety of sensors into real-time contextual messages is disclosed. The DCL software incorporates customizable software components known as plug-ins to expand the use of the mobile computing device.

17 Claims, 5 Drawing Sheets

(56) References Cited

U.S. PATENT DOCUMENTS

| | | | |
|---|---|---|---|
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,805,079 B2* | 8/2014 | Petrou | G06F 17/30253 382/187 |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 9,154,927 B2 | 10/2015 | Kearney | |
| 9,224,025 B2 | 12/2015 | Ding et al. | |
| 9,258,033 B2 | 2/2016 | Showering | |
| 9,262,660 B2 | 2/2016 | Lu et al. | |
| 9,324,304 B2* | 4/2016 | Sugita | G06T 7/001 |
| 9,367,886 B2* | 6/2016 | Davis | G06Q 30/0201 |
| 9,412,201 B2* | 8/2016 | Kinnebrew | G06T 19/006 |
| 2007/0063048 A1 | 3/2007 | Havens et al. | |
| 2008/0185432 A1 | 8/2008 | Caballero et al. | |
| 2009/0134221 A1 | 5/2009 | Zhu et al. | |
| 2009/0237546 A1* | 9/2009 | Bloebaum | G06F 3/011 348/333.01 |
| 2010/0020221 A1* | 1/2010 | Tupman | G06F 3/04883 348/333.01 |
| 2010/0161658 A1* | 6/2010 | Hamynen | H04N 21/6131 707/770 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0073651 A1* | 3/2011 | Chiou | G06K 7/14 235/462.07 |
| 2011/0161076 A1* | 6/2011 | Davis | G06F 3/04842 704/231 |
| 2011/0169999 A1 | 7/2011 | Grunow et al. | |
| 2011/0202554 A1 | 8/2011 | Powilleit et al. | |
| 2011/0284625 A1* | 11/2011 | Smith | G06K 7/1098 235/375 |
| 2012/0111946 A1 | 5/2012 | Golant | |
| 2012/0138685 A1 | 6/2012 | Qu et al. | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |

(56) References Cited

U.S. PATENT DOCUMENTS

| | | | |
|---|---|---|---|
| 2012/0230538 A1* | 9/2012 | Calman | G06F 17/30247 382/103 |
| 2012/0232937 A1* | 9/2012 | Calman | G06Q 30/06 705/4 |
| 2012/0248188 A1 | 10/2012 | Kearney | |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedraro | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0025584 A1 | 1/2014 | Liu et al. | |
| 2014/0027518 A1 | 1/2014 | Edmonds et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061305 A1 | 3/2014 | Nahill et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0075846 A1 | 3/2014 | Woodburn | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0084068 A1 | 3/2014 | Gillet et al. | |
| 2014/0097249 A1 | 4/2014 | Gomez et al. | |
| 2014/0098127 A1* | 4/2014 | Fein | G06F 3/011 345/633 |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Kearney | |
| 2014/0121445 A1 | 5/2014 | Ding et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131441 A1 | 5/2014 | Nahill et al. | |
| 2014/0131443 A1 | 5/2014 | Smith | |
| 2014/0131444 A1 | 5/2014 | Wang | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0146082 A1* | 5/2014 | So | G06K 9/00671 345/633 |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0160329 A1 | 6/2014 | Ren et al. | |
| 2014/0166755 A1 | 6/2014 | Liu et al. | |
| 2014/0166757 A1 | 6/2014 | Smith | |
| 2014/0166759 A1 | 6/2014 | Liu et al. | |
| 2014/0166760 A1 | 6/2014 | Meier et al. | |
| 2014/0166761 A1 | 6/2014 | Todeschini et al. | |
| 2014/0168787 A1 | 6/2014 | Wang et al. | |
| 2014/0175165 A1 | 6/2014 | Havens et al. | |
| 2014/0175169 A1 | 6/2014 | Kosecki et al. | |
| 2014/0175172 A1 | 6/2014 | Jovanovski et al. | |
| 2014/0175174 A1 | 6/2014 | Barber | |
| 2014/0191644 A1 | 7/2014 | Chaney | |
| 2014/0191913 A1 | 7/2014 | Ge et al. | |
| 2014/0197238 A1 | 7/2014 | Lui et al. | |
| 2014/0197239 A1 | 7/2014 | Havens et al. | |
| 2014/0197304 A1 | 7/2014 | Feng et al. | |
| 2014/0203087 A1 | 7/2014 | Smith et al. | |
| 2014/0204268 A1 | 7/2014 | Grunow et al. | |
| 2014/0210968 A1 | 7/2014 | Kauniskangas et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0267399 A1* | 9/2014 | Zamer | H04L 67/20 345/633 |
| 2014/0279719 A1* | 9/2014 | Bohus | G06N 20/00 706/11 |
| 2014/0358913 A1* | 12/2014 | Cai | G06F 16/904 707/728 |
| 2015/0120456 A1* | 4/2015 | Goulart | G06Q 30/0261 705/14.58 |
| 2015/0153572 A1* | 6/2015 | Miao | G02B 27/017 345/8 |
| 2016/0004527 A1* | 1/2016 | Udd | G06F 8/65 717/172 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

U.S. Appl. No. 14/376,472, for an Encoded Information Reading Terminal Including HTTP Server filed Aug. 4, 2014, (Lu); 30 pages.

U.S. Appl. No. 13/771,508 for an Optical Redirection Adapter, filed Feb. 20, 2013 (Anderson); 26 pages.

U.S. Appl. No. 14/340,716 for an Optical Imager and Method for Correlating a Medication Package With a Patient, filed Jul. 25, 2014 (Ellis); 26 pages.

U.S. Appl. No. 13/852,097 for a System and Method for Capturing and Preserving Vehicle Event Data, filed Mar. 28, 2013 (Barker et al.); 20 pages.

(56) References Cited

OTHER PUBLICATIONS

U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System For Providing A Continuous Communication Link With A Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.

U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same On a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively To Trigger Signal Activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
U.S. Appl. No. 14/274,858 for Mobile Printer With Optional Battery Accessory, filed May 12, 2014, (Marty et al.); 26 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.

(56) References Cited

OTHER PUBLICATIONS

U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.
U.S. Appl. No. 14/379,057 for Method of Using Camera Sensor Interface To Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.

Examination Report for related EP Application No. 15180459.8, dated Apr. 13, 2018, 6 pages [All references previously cited.].
Annex to the communication Mailed on Dec. 4, 2019 for EP Application No. 15180459.8, 3 pages.
Communication from the Examining Division dated Dec. 4, 2019 for EP Application No. 15180459.8, 2 pages.
U.S. Patent Application for System and Method for Measuring Irregular Objects with a Single Camera filed Jan. 28, 2014 (Li et al.), U.S. Appl. No. 14/165,980, 23 pages.
U.S. Patent Application Imaging Terminal Having Data Compression filed Apr. 11, 2014, (Deng et al.), U.S. Appl. No. 14/250,923, 35 pages.
Annex to the communication Mailed on May 4, 2021 for EP Application No. 15180459, 4 pages.
Communication from the Examining Division dated May 4, 2021 for EP Application No. 15180459, 2 pages.
Communication pursuant to Article 94(3) EPC dated Dec. 23, 2021 for EP Application No. 15180459, 7 pages.

* cited by examiner

MOBILE COMPUTING DEVICE WITH DATA COGNITION SOFTWARE

FIELD OF THE INVENTION

The present invention relates to mobile computing devices (e.g., barcode readers), and more specifically, to a mobile computing device with data cognition software stored in memory that configures a processor to convert low level information from sensors into a predetermined action, designed to operate on a particular data type.

BACKGROUND

Generally speaking, a worker is faced with many pieces of information in the course of their work. Each piece of information can be used individually or in combination to help the worker be more productive at their job. This information is often coded or in a raw state. In either case, the information may be hard to use. One way to increase productivity is to utilize a mobile computing device for collecting, aggregating, and inferring context from this information. The mobile computing device may then present timely and informative contextual messages to the user, thereby allowing the worker to become more knowledgeable and efficient.

Not all work environments are the same. As a result, the mobile computing device must also be highly configurable in order to address the particular requirements of a work environment.

A need, therefore, exists for a mobile computing device that utilizes customizable data cognition software to convert sensed information into timely contextual messages that are easily understood by a worker.

SUMMARY

Accordingly, in one aspect, the present invention embraces a mobile computing device including a user-interface (UI) system, a communication module, a memory, and a processor. The UI system includes input sensors (e.g., digital camera, GPS receiver, touch-screen, RTLS device, and/or microphone) for capturing input information. The UI system also includes a visual display (e.g., touch screen display) for displaying digital images and contextual messages to a user. The communication module facilitates the transmission and reception of information to and from a remote device (e.g., database storage system). The mobile computing device includes memory for storing a data cognition layer (DCL) software program. The DCL software program is executed by the processor to (i) receive the input information from the input sensors, (ii) recognize the input information, (iii) transform the input information into information elements, (iv) convert the information elements into contextual messages, and (v) to format data, send data to a remote server, log data, make the device buzz, or any other operation that takes the sensor data as an input (e.g., transmit the contextual messages to the UI system for display).

In an exemplary embodiment, The DCL program includes software plug-ins for creating contextual messages from the input information and a plug-in manager software for coordinating the execution of the software plug-ins as well as the software plug-in communication (e.g., the exchange of information between the software plug-ins).

In another aspect, the present invention embraces a mobile computing device (MCD) including a user-interface (UI) system integrated with at least one input sensor (e.g., digital camera) for capturing input information (e.g., video stream of real-time images) and integrated with a visual display and touch screen for displaying images and generating touch information in response to a touch. The MCD includes a memory for storing a local data cognition layer (DCL) software program and a communication module for facilitating communication between the MCD and a cloud DCL software program executed by a remote computing device. The remote computing device is connected to the MCD via a network. The MCD includes a processor connected to the UI system, the memory, and the communication module. The processor is configured for executing the local DCL software program to (i) receive the input information and touch information from the UI system's digital camera and touch screen, (ii) communicate the input information and touch information to the cloud DCL software program via the communication module, (iii) receive contextual messages from the cloud DCL software program via the communication module, and (iv) transmit the contextual messages to the UI system's visual display.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
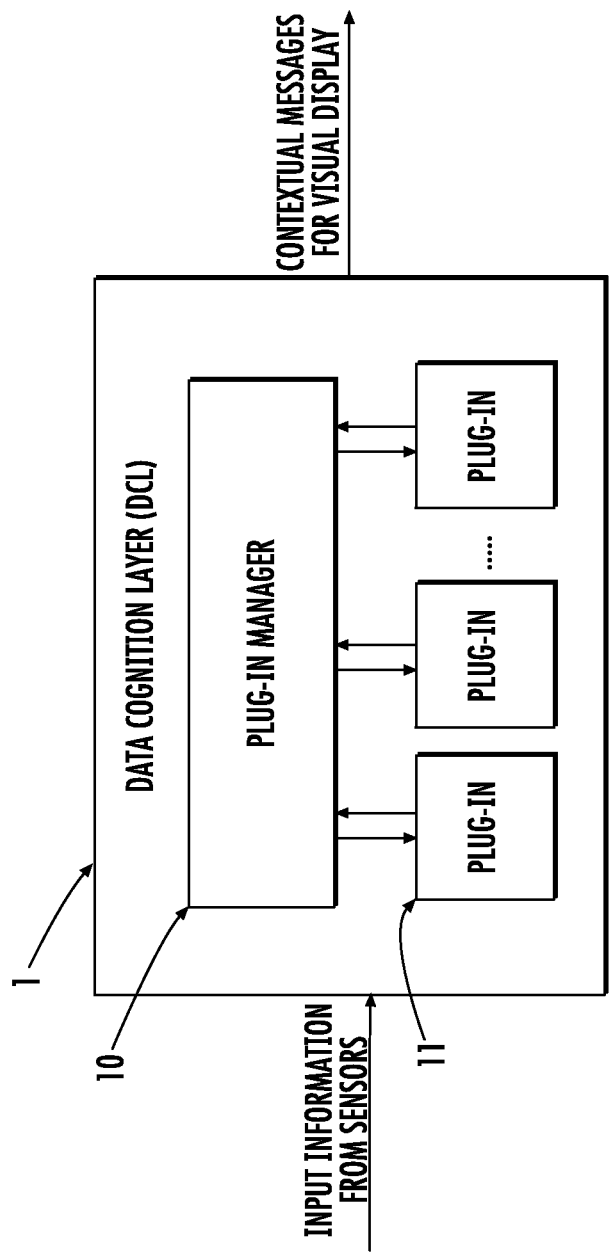
FIG. 1 schematically depicts the data cognition layer software framework.

The present invention embraces a mobile computing device enabled by a customizable data cognition layer (DCL) software program to convert input information from sensors into contextual messages for a user. The DCL software incorporates software plug-ins, which are specialized software components that expand the use of the mobile computing device.

The mobile computing device includes a user-interface (UI) system. The UI system typically includes at least one sensor for capturing input information and a visual display for displaying digital images and contextual messages to a user. A typical sensor is a digital camera. Here the input information are real-time video images of the camera's field of view. This input information could be printed or displayed symbols (e.g., barcodes), a recognizable object (e.g., a particular product), or could be a user's behavior. The user's behavior may include motion (e.g., hand motion), touch (e.g., finger touch), voice information (e.g., audible command), or eye gestures (e.g., eye gaze). In some cases, other sensors may be included with, or used separately from, the digital camera. For example, a barcode scanner (e.g., laser barcode scanner) could be used to obtain barcode information, while a global positioning system (GPS) or a real-time locating system (RTLS) could be used to obtain the mobile computing device's location.

The UI system's visual display usually includes a touch screen to capture a user's response to a prompt. The user's response could be multi-touch gestures (e.g., double tap). The visual display typically displays real-time video images of the camera's field of view. When a recognizable object (e.g., a barcode) is present in the images, the DCL software generates a contextual message for display. This contextual message is typically displayed superimposed on the real-time video images in a way that also provides information. For example, if multiple recognizable objects (e.g., barcodes) are found in the camera's images and each generates a contextual message, then each message may be displayed over the appropriate object in order to indicate an association between the contextual message and the object. Sometimes, the contextual message will include a prompt requesting a user response (e.g., immediate response). For example a graphical button indicating that further information is available may be presented on the display, and a user may choose to access this information by pressing the graphical button.

The mobile computing device includes memory that stores the DCL software program. The memory is accessible by a processor that is configured for executing the DCL software program. The DCL software also provides the framework and controls necessary to enable a set software components (i.e., plug-ins) to transform raw data (i.e., input information) from a sensor into information elements. The DCL software includes at least one software plug-in and a plug-in manager software. The plug-in manager software coordinates the execution of the software plug-ins by providing the input information from the sensors to each plug-in in a specified order. For example, the plug-in manager can be configured to ignore some plug-ins while sending input information to others. The plug-in manager also coordinates the results from the various plug-ins and helps to generate contextual messages for the UI system. For example, the plug-in manager may combine the outputs of software plug-ins to form a contextual message. In some embodiments, the plug-in manager facilitates the exchange of information between the software plug-ins since higher level inferences may be formed through the aggregation of multiple lower level state assessments.

The software plug-ins (i.e., plug-ins) infer contextual data from the input information provided by the sensors. The plug-ins are generally configured by a user, allowing third party developers to create custom plug-ins for functionality and data types of their choosing.

As shown in FIG. 1, the data cognition layer (DCL) software 1 transforms input information from the sensors into contextual messages for visual display. The plug-in manager software 10 coordinates the input/output of each plug-in 11.

A communication module integrated into the mobile computing device allows for data to be transmitted to, and received from, a remote device 33. The communication link 32 may be a wired or wireless connection. In some embodiments, the remote device 33 is a database storage system that collects data from the mobile computing device and stores it for additional processing or later access. For example, a plurality of information elements stored in this database storage system could be accessed for higher level analysis of a business process or operation. The results of this analysis could be provided to companies in order to help them understand more about a user's behavior and with the goal of enhancing productivity.

In some embodiments, the DCL software's functions are split between the mobile computing device and a remote computing device 35 located on a network to which the mobile computing device is connected to via its communication module. Inferences occur in the network (i.e., cloud) by the cloud DCL software 37 while plug-in management is executed on the mobile computing device by the local DCL software 34 executed by the processor.

Figure 2:
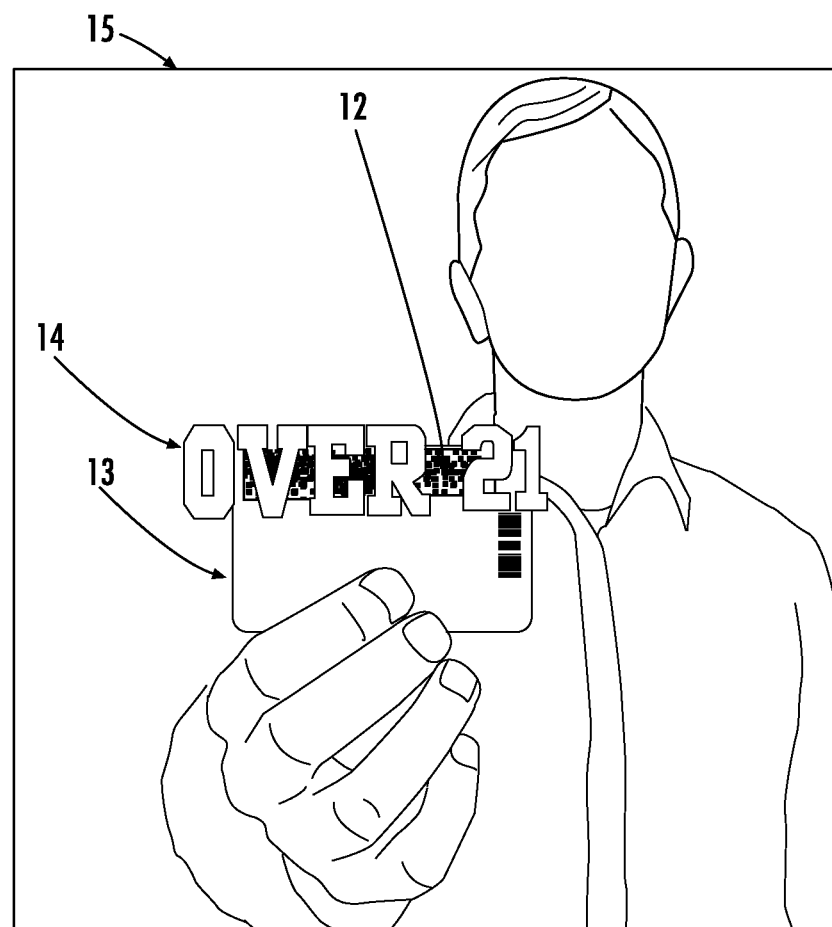
FIG. 2 graphically depicts an exemplary image of a barcoded driver's license with a contextual message.

In an exemplary embodiment, a mobile computing device (i.e., MCD) running the software application is configured with a plug-in for verifying a customer's age from a barcode on the customer's driver's license. Here the MCD's sensor is a digital camera for obtaining real time images of its field of view. These images are passed to the plug-in. When the plug-in recognizes a barcode within an image it decodes it. Presenting this decoded information directly to a user, however, would be of limited use. The age information in the decoded barcode data may be (i) embedded within a long string, (ii) unlabeled, or (iii) otherwise presented in a way difficult for a user to recognize. The software plug-in, however, is configured to recognize this decoded barcode data and transform this data into a set of information elements including age. The information elements are converted into a contextual message. In this example, the driver's license barcode is scanned for verification (e.g., to answer the question, "is this person over 21?"). The resulting contextual message is presented for display. FIG. 2 shows the result of this embodiment. Here the barcode 12 on the driver's license 13 is scanned and a contextual message 14, "over 21," is shown on a display overlaid on the barcode within the camera's real time image of the field of view 15.

Figure 3:
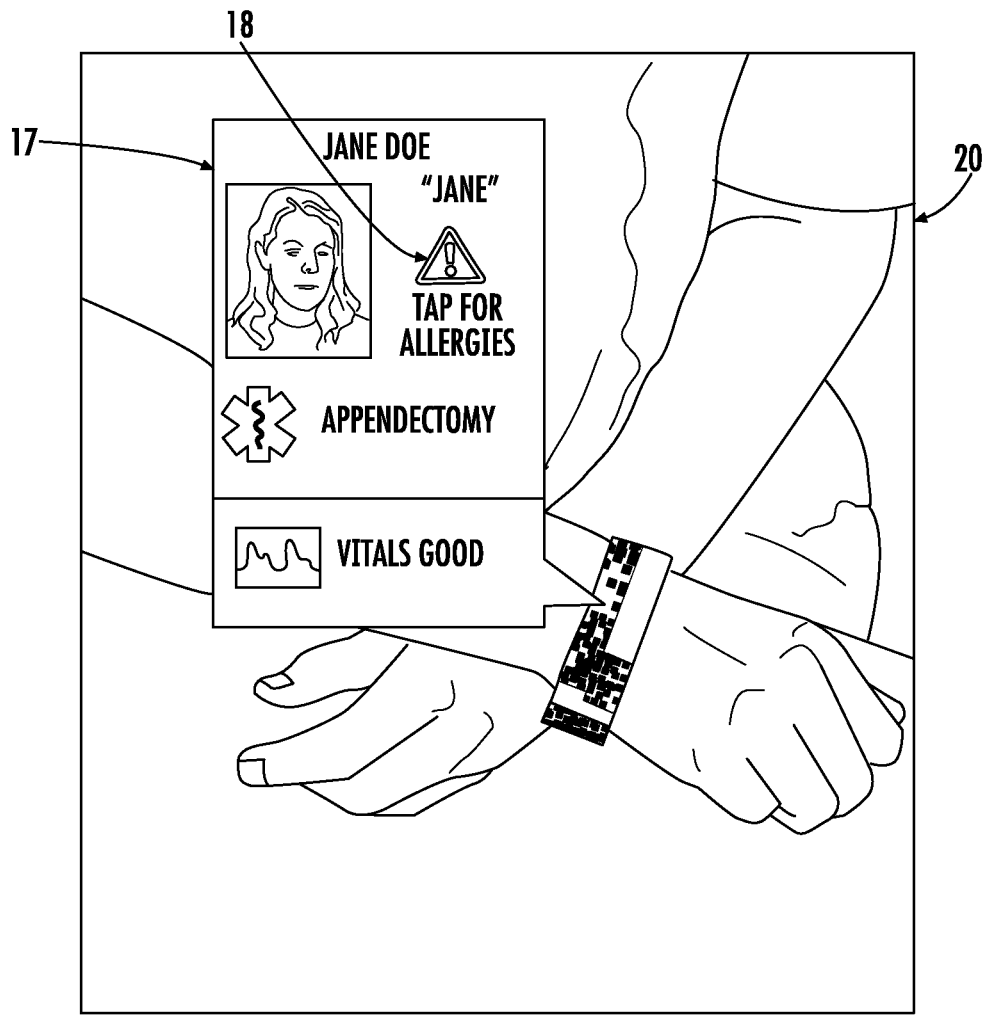
FIG. 3 graphically depicts an exemplary image of a patient barcode with a contextual message.

Sometimes the contextual messages will include prompts for a user to take some action. Much like the previous embodiment, in this embodiment the mobile computing device is configured with a digital camera as the sensor. The images from the digital camera are displayed on a touch screen display. The input information for the software application includes digital images from the digital camera as well as touch signals from the touch-screen display. The software application passes images from the digital camera to the plug-in. The plug-in passes these images back unprocessed until some data within an image is recognized. This recognition occurs when the user positions the camera's field of view so that the patient's barcoded arm band is within the field of view. The plug-in recognizes the barcode and decodes it. In this case the decoded information represents a more complicated data set and may not all be of interest to a user. Rather than presenting all the information at once, the contextual message includes a prompt for user response. As shown in FIG. 3, the contextual message 17 includes a prompt 18 that reads, "tap for allergies." If the user needs this allergy information, then this icon can be touched to initiate its retrieval. The act of touching creates a signal for the DCL software program to respond to by displaying the allergy information. This allergy information may be displayed as an overlay on the real-time video images of the digital camera 20.

The previous embodiments used a digital camera as the sensor and a touch screen as the display and user input mechanism. Other embodiments, however, can be conceived that use different sensors for these purposes expanding the data cognition beyond simple translation of barcode data. These sensors include sensors for recognizing objects. Sensors for detecting user behaviors such as motion, touch, voice, and gaze are also within the scope of the present invention. Global positioning (GPS) and real-time locating (RTL) sensors may be used and are especially important when the mobile computing device is worn. Wearable form factors could include smart watches and/or glasses.

Figure 4:
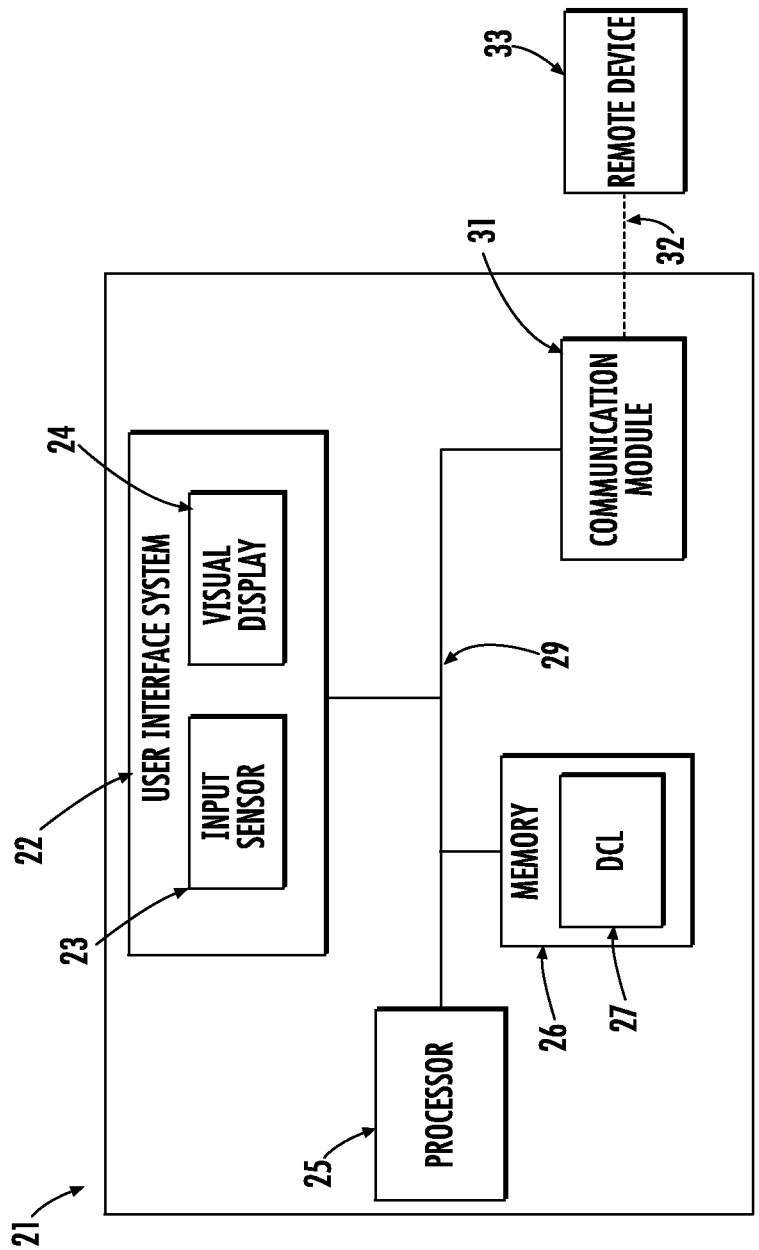
FIG. 4 schematically depicts an exemplary embodiment of the mobile computing device with local data cognition.
Figure 5:
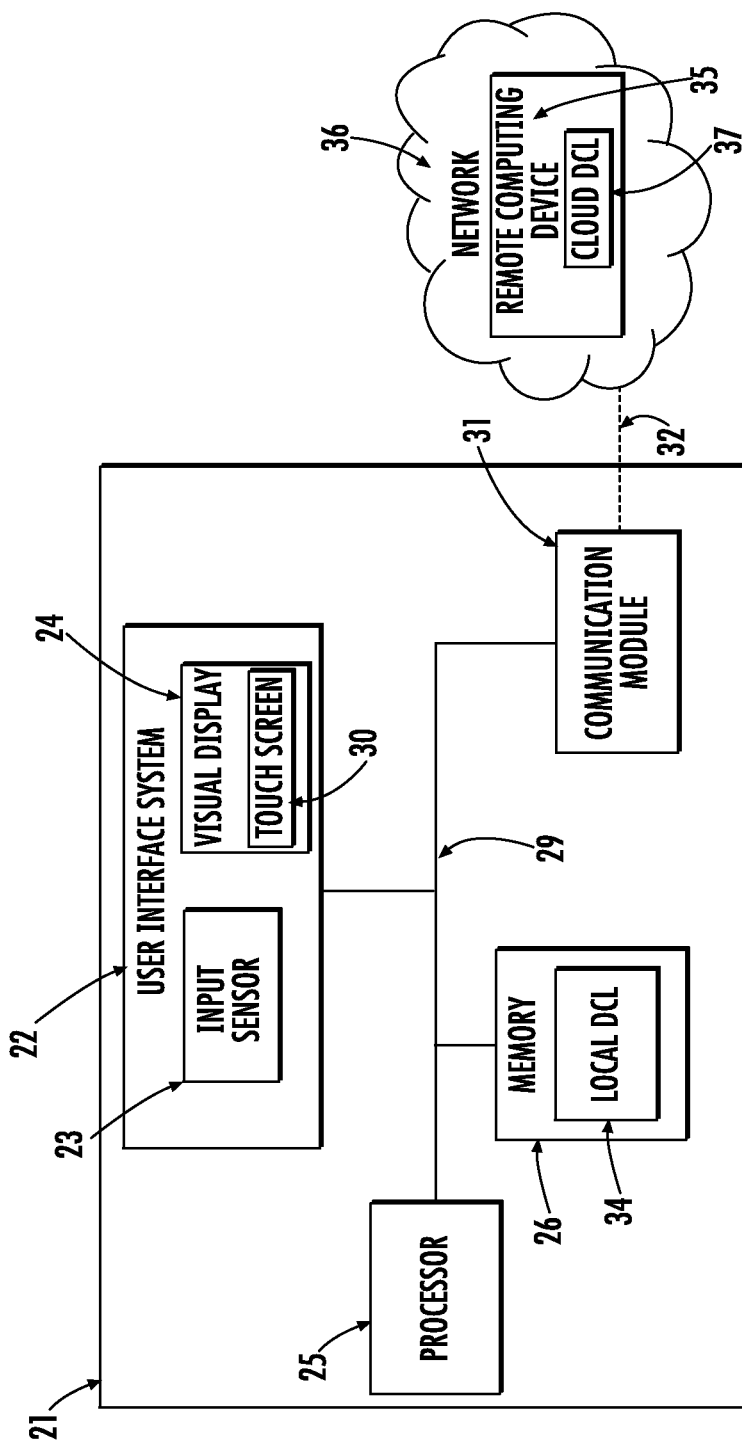
FIG. 5 schematically depicts an exemplary embodiment of the mobile computing device with remote data cognition.

FIGS. 4 and 5 schematically depict two exemplary mobile computing devices 21 in accordance with the present disclosure. The mobile computing device 21 typically includes a processor 25, a memory 26, a user interface system 22, and a communication module 31. The user interface system having at least one input sensor 23 for gathering input information and a visual display for rendering information. The processor 25 is communicatively coupled to the memory 26, the input sensor 23, the visual display 24, and the communication module 31.

Exemplary mobile devices may include a system bus 29 and/or one or more interface circuits (not shown) for coupling the processor 25 and other components to the system bus 29. In this regard, the processor 25 may be communicatively coupled to each of the other components via the system bus 29 and/or the interface circuits. Similarly, the other components (e.g., the memory 26, the input sensor 23, the visual display 24, and the communication module 31) may each be communicatively coupled to other components via the system bus 29 and/or the interface circuits. Other embodiments of system bus architecture providing for efficient data transfer and/or communication between the components of the device may also be employed in exemplary embodiments in accordance with the present disclosure.

The processor 25 is configured to execute instructions and to carry out operations associated with the generation, display and interaction with contextual messages generated by a data cognition layer software program 27 stored in memory 26. The memory 26 generally provides a place to store computer code and data that are used by the mobile computing device 21. The memory 26 may include Read-Only Memory (ROM), Random-Access Memory (RAM), a hard disk drive, and/or other non-transitory storage media.

The user interface system 22 includes one or more components capable of interacting with a user (e.g., receiving information from a user or outputting information to a user). As depicted in FIG. 4, the user interface system 22 includes a visual display 24. Typically, the visual display 24 is a touchscreen, which is capable of displaying visual information and receiving tactile commands from a user (e.g., selections made by touching the screen with a finger or a stylus, by pointing at a desired selection, or by looking at a desired selection for a predefined period of time). In addition to the visual display 24, the user interface system 22 may also include one or more speakers, buttons, keyboards, and/or microphones.

As noted, the mobile computing device 21 typically includes a communication module 31. The communication module 31 enables the mobile computing device 21 to communicate with a remote device 33. This communication link 32 may be wired or wireless and the remote device 33 may be directly connected or connected via a network 36.

The input sensor 23 is typically a digital camera and is able to capture still photographs and/or video. Although FIGS. 4 and 5 depict the mobile computing device 21 as having a single input sensor 23, it is within the scope of the present invention for the mobile computing device 21 to include more than one input sensor. When more than one input sensor is used, the sensors may be different in their construction, mode, or means. Alternatively the sensors could be duplicates.

The processor 25 is configured by software application and software plug-ins stored in memory 26 to perform data cognition algorithms in order to transform low level data into meaningful contextual messages (i.e., data cognition). In the embodiment shown in FIG. 4, the program code to enable this transformation is stored locally on the mobile computing device 21. In the embodiment shown in FIG. 5, however, the data cognition occurs on a remote computing device 35 running a software application (i.e., cloud data cognition layer software program 37) and connected to the mobile computing device 21 via a network 36 (i.e., cloud). The mobile computing device's local software application (i.e., local data cognition layer software program 34) would perform tasks other than data cognition (e.g., coordinating communication with cloud data cognition layer software program 37). In this embodiment, the software plug-ins could be stored remotely in a remote computing device 35.

The data collected and transformed into contextual messages could be stored locally on the mobile computing device 21 or could be communicated to a remote device 33 for storage. This remote device 33 could house and manage a database. It is envisioned that this database of information could form the basis of further data cognition.

The present disclosure addresses the problem that workers are faced with a variety of pieces of information as they go about their jobs. Each piece of information can be used individually or in combination to help the worker be more productive. Barcode scanners and mobile computers are commonly used by workers to enhance productivity. Increasingly smartphones and tablets are being adopted due to their form factor, computing power, rich developer application programming interfaces (i.e., API) and their combination of sensors and a display. New wearable form factors are being introduced such as smart watches and glasses. The goal is to increase productivity, and one way to do that is to present actionable alerts and information to the user at the moment in time that the user is able to consume the information. The most pertinent information may be formed only by aggregating a number of lower level pieces of information into a higher level inference. Inferences may occur in real-time on a mobile or wearable device, or they may occur in the cloud. Inferences may trigger immediate feedback to the user to help him understand the world around him. Alternately a plurality of pieces of information could be collected in a database for higher level analysis of a business process or operation, and the results of that analysis could be provided to companies to help them understand more about how their workers behave with the goal of enhancing productivity. Ideally all of this will be accomplished in a standardized manner that allows third parties to contribute their own solutions, and for users to select an arbitrary collection of solutions from a marketplace of available solutions.

Barcodes today have many purposes in addition to simply identifying products in a retail environment. They can contain many different types of data like web URLs, TWITTER® accounts, FACEBOOK® accounts, telephone numbers, shipment tracking info, email addresses, Wi-Fi network info, and any other type of data that might be useful within a data collection system. This has resulted in a variety of barcode scanning applications for smartphone platforms, as well as a number of APIs for developers to incorporate barcode scanning into their applications. Many of these APIs are adequate for identifying a barcode and retrieving its encoded data, but few attempt to understand the data that is being scanned. Few, if any, facilitate real-time user interaction with a just-in-time user interface (i.e., UI) that is custom tailored to the data type recognized. Furthermore, none of these solutions allow third party developers to create plug-ins providing this functionality for a data type of their choosing. The software described in the present disclosure would fill this gap. Here data cognition goes beyond simple translation of barcode data. Rather, the software application disclosed can deduce context from multiple cues, including singular or plural machine-recognizable objects in the field of view of a camera. Also user behaviors such as motion, touch, voice, and gaze may be used to deduce context. In addition, user location such as GPS or other teal-time locator services may be used. Ultimately the software application disclosed presents relevant context-sensitive data to the user so that the user can take appropriate action (or take no action as needed) for improved productivity. The disclosed software architecture is an implementation that makes this possible.

The software application disclosed (i.e., the data cognition layer or DCL) is a plug-in framework. The DCL attempts to understand the type of barcode data being scanned and provides the user with context sensitive options for the scanned data type. This is done by filtering the data though all DCL plug-ins that are registered within the system. A DCL plug-in has the responsibility to determine what type of data it is capable of acting on and to quickly return if it does not recognize the data. It has the ability to render its own user interface (UI), which is overlaid on top of a real-time preview of what the camera is currently viewing. This UI can detect single screen touches, multi-touches and even gesturing. The UI may also detect glances and stares and track the direction of the user's gaze. The UI may also detect voice commands. This gives a DCL plug-in the ability to execute logic on only data that it understands and provide a just-in-time UI to the user based on the particular data type. This lets us modularize our middleware and provides a very context sensitive UI experience. The DCL is extensible to allow third party developers to create their own plug-ins for a custom look and feel that is tailored to match their particular application aesthetics. Each plug-in may maintain data that describes the context, so that it can react differently under different contexts. Plug-ins may be designed to exchange data with one another since higher level inferences may be formed through the aggregation of multiple lower level state assessments.

The data cognition layer is implemented by utilizing a plug-in manager class that is responsible for loading and unloading all DLC plug-ins with the system. This plug-in manager is also responsible for all communication to/from the registered plug-ins within the system. All DCL plug-ins will be derived from the same DCL plug-in base class, which may require certain methods to be implemented. This could be done relying on known computer science design patterns (e.g., abstract and/or protected methods, interfaces, etc.).

The data cognition provided by the DCL and the plug-ins augments the user's current context with context-relative information that the user needs to be more productive. The system seeks to overlay meaningful information on a real-time camera view.

As the user moves about the camera view is changing in real-time and the data cognition system is looking for pieces of information that it recognizes. These may be an object that it recognizes (e.g., a barcode) or a user behavior such as touch, voice, or eye movement. It could be the user's current location. These pieces of information, (i.e., information elements) are converted into context. In much the way different arrangements of atoms form different molecules, the disclosed system recognizes different arrangements of information elements as unique context. Ultimately it is the goal of the disclosed system to selectively present just that information that the user needs at that point of time to make him more productive and more efficient. The display of every piece of information could overwhelm the user, so the system aggregates a plurality of information elements that leads to higher-level inferences, and attempts to display that which is pertinent.

Different workers operate in different environments, and their jobs exist in different contexts. What is pertinent to each worker varies by profession. Companies have formed to specialize in one type of work or another, and they have developed an expertise in the way that those workers consume information. Thus it is not practical for one company to be able to make high level inferences that are pertinent to every worker. The DCL embodies an architecture that allows multiple companies to develop solutions for a certain type of worker. Multiple companies can develop plug-ins to (a) understand what information is pertinent, (b) making high level inferences, and (c) augmenting the worker's environment.

Barcodes are commonly used as a tool to reduce errors and to make users more productive by tagging items with machine readable codes. Barcode recognition is an example of information that a vision system can capture. At the lowest level the barcode contains a collection of numbers and letters and bytes. For example, a tracking number barcode might contain the data "1Z4YE7510220565189". Presenting that information to a user will likely not make that person more productive. However, the data cognition layer might recognize that as a tracking number and extract the information that the worker needs: the entity that shipped the package, the class of service, the unique package identifier. It could perform checking to be sure that the tracking number is valid. What gets presented to the user generally depends on the user's job. For example, the worker may only need to know the class of service. A well-designed DCL system would recognize the presence of a tracking barcode, parse the pertinent information, and display that to the user. For example the class of service could be displayed as "UPS United States Next Day Air" or it could be displayed as a graphic representation of a red colored jet airplane to indicate Next Day Air service. The graphical overlay will augment the cameras field of view and the pertinent information would be displayed as an overlay on the real-time camera view. As an example of a well-designed DCL system, the overlay might be suppressed from display until the user's gaze settles on the barcode. The overlay might be suppressed from display until a user issues a voice command such as "Display Class of Service".

Barcode symbology standards have been written to describe how to encode certain data characters into bar code format. Industry standards have been written to describe how to use barcodes as a carrier for pertinent business information. Different DCL plug-ins will be responsive to different types of stimulus, and will extract the pertinent information, and will display in a way that is useful to a worker of a consumer of information. One manufacturer may be an expert at barcode recognition and understands a plurality of industry standards, while other third party developers may recognize different object types and different industry standards. The DCL architecture is the framework that allows an arbitrary collection of plug-ins to operate contemporaneously, so that the system is constantly seeking to recognize and aggregate information elements and to present pertinent information to the user. A user will purchase and use the DCL plug-ins that he feels add the most value to his job.

When a barcode scanning operation is initiated by the application, a real-time camera preview UI is displayed which is used as a viewfinder by the user. On top of this, the transparent DCL UI layer is displayed. This is the layer that gets drawn upon by all DCL plug-ins registered within the system. At this point all DCL plug-ins get initialized. Once a barcode is found by the decoder, the result is iteratively passed to all DCL plug-ins. Each DCL plug-in then checks whether it is capable of acting on the data. If it understands the data, then some plug-in specific task is performed. This could be the parsing and formatting of the data into an easy to use object which is returned to the calling application. It could be the launching of a third party application that knows how to handle the particular data. Or, it could be, but is not limited to, the rendering of a custom UI that may (or may not) expect further user interaction. In any event, it is the plug-in's responsibility to return both context and any data to the calling application once it has run to completion. Each plug-in also has the ability to determine how often the UI is refreshed and if any other plug-ins should be allowed to process the data after it is done with it.

To supplement the present disclosure, this application incorporates entirely by reference the following patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0214048;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034723;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;

U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0086348;
U.S. Patent Application Publication No. 2014/0097249;
U.S. Patent Application Publication No. 2014/0098284;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/736,139 for an Electronic Device Enclosure, filed Jan. 8, 2013 (Chaney);
U.S. patent application Ser. No. 13/771,508 for an Optical Redirection Adapter, filed Feb. 20, 2013 (Anderson);
U.S. patent application Ser. No. 13/780,356 for a Mobile Device Having Object-Identification Interface, filed Feb. 28, 2013 (Samek et al.);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/047,896 for Terminal Having Illumination and Exposure Control filed Oct. 7, 2013 (Jovanovski et al.);
U.S. patent application Ser. No. 14/053,175 for Imaging Apparatus Having Imaging Assembly, filed Oct. 14, 2013 (Barber);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/118,400 for Indicia Decoding Device with Security Lock, filed Nov. 18, 2013 (Liu);

U.S. patent application Ser. No. 14/150,393 for Indicireader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/222,994 for Method and Apparatus for Reading Optical Indicia Using a Plurality of Data filed Mar. 24, 2014 (Smith et al.);

U.S. patent application Ser. No. 14/230,322 for Focus Module and Components with Actuator filed Mar. 31, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/249,497 for Terminal Having Plurality of Operating Modes filed Apr. 10, 2014, Grunow et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.)

U.S. patent application Ser. No. 14/257,364 for Docking System and Method Using Near Field Communication filed Apr. 21, 2014, (Showering);

U.S. patent application Ser. No. 14/264,173 for Autofocus Lens System for Indicia Readers filed Apr. 29, 2014, (Ackley et al.);

U.S. patent application Ser. No. 14/274,858 for Mobile Printer with Optional Battery Accessory filed May 12, 2014, (Marty et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.);

U.S. patent application Ser. No. 14/345,735 for Optical Indicia Reading Terminal with Combined Illumination filed Mar. 19, 2014 (Ouyang);

U.S. patent application Ser. No. 29/486,759 for an Imaging Terminal, filed Apr. 2, 2014 (Oberpriller et al.); and U.S. patent application Ser. No. 14/355,613 for Optical Indicia Reading Terminal with Color Image Sensor filed May 1, 2014, (Lu et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile computing device comprising:
a user-interface (UI) system comprising (i) at least one input sensor for capturing input information that comprises a computer recognizable object and user behavior information, wherein the at least one input sensor comprises a digital camera; and (ii) a visual display for displaying digital images comprising real-time video images of a field of view of the digital camera and one or more contextual messages corresponding to the input information;
a memory for storing a data cognition layer (DCL) software program comprising a first software plug-in and a second software plug-in;
a communication module for transmitting and receiving information to and from a remote device; and
a processor communicatively coupled to the UI system, the memory, and the communication module, the processor configured to execute the DCL software program to:
  (i) receive the input information comprising the computer recognizable object and the user behavior information from the at least one input sensor, wherein the computer recognizable object comprises a barcode,
  (ii) filter the barcode through each of the first software plug-in and the second software plug-in to determine a type of the barcode recognized in the input information and to determine if at least one of the first software plug-in or the second software plug-in is capable of acting on the determined type of the barcode, wherein the acting on the determined type of the barcode comprises performing a task specific to at least one of the first software plug-in or the second software plug-in, and wherein the first software plug-in is configured to recognize a first type of barcode data and the second software plug-in is configured to recognize a second type of barcode data, (iii) transform the input information into information elements, (iv) selectively identify the information elements as having context-sensitive data relevant to a user at that time, wherein selectively identifying the information elements comprises recognizing each of different arrangements of a plurality of information elements as a unique context, (v) generate the one or more contextual messages based on the identified information elements, and (vi) transmit the one or more contextual messages to the UI system for display;

wherein the first software plug-in comprises first context data defining a first context for the first software plug-in and the second software plug-in comprises second context data defining a second context for the second software plug-in, and wherein each of the first software plug-in and the second software plug-in is further configured to:

process the input information to determine whether the respective one of the first software plug-in and the second software plug-in is applicable, and render its own user interface (UI) which is overlaid on the digital image being displayed on the visual display to provide additional information associated with at least one contextual message of the one or more contextual messages, in response to the respective one of the first software plug-in and the second software plug-in being applicable and in response to detection of user input issued by the user for the at least one contextual message, wherein the one or more contextual messages comprises a first just-in-time contextual message based on the first software plug-in being applicable, or wherein the one or more contextual messages comprises a second just-in-time contextual message based on the second software plug-in being applicable, the first just-in-time contextual message being custom tailored for the first software plug-in and the second just-in-time contextual message being custom tailored for the second software plug-in, and wherein the first context data is different from the second context data, and the first just-in-time contextual message is different from the second just-in-time contextual message.

2. The mobile computing device according to claim 1, wherein the DCL software program further comprises a plug-in manager software for coordinating execution of the first and second software plug-ins and software plug-in communication.

3. The mobile computing device according to claim 2, wherein the plug-in manager software facilitates an exchange of context data between the first and second software plug-ins.

4. The mobile computing device according to claim 2, wherein the one or more contextual messages comprises a contextual message that comprises a combination of outputs from the first and second software plug-ins.

5. The mobile computing device according to claim 1, wherein the visual display's digital images further comprise the one or more contextual messages superimposed over the real-time video images.

6. The mobile computing device according to claim 5, wherein the at least one input sensor further comprises a touch screen, and the input information further comprises multi-touch gesture information.

7. The mobile computing device according to claim 1, wherein the one or more contextual messages comprise prompts requesting a user response.

8. The mobile computing device according to claim 1, wherein the at least one input sensor further comprises a barcode scanner.

9. The mobile computing device according to claim 1, wherein the at least one input sensor further comprises a global positioning system (GPS) receiver, and the input information further comprises location information.

10. The mobile computing device according to claim 1, wherein the at least one input sensor further comprises a real-time locating system (RTLS) device, and the input information further comprises location information.

11. The mobile computing device according to claim 1, wherein the at least one input sensor further comprises a microphone and the input information further comprises voice information.

12. The mobile computing device according to claim 1, wherein the at least one input sensor further comprises an eye-tracking device (ETD) and the input information further comprises eye information.

13. The mobile computing device according to claim 1, wherein the mobile computing device is worn by the user.

14. The mobile computing device according to claim 1, wherein the remote device is a database storage system.

15. The mobile computing device according to claim 1, wherein the processor is further configured to execute the DCL software to:

(vii) display the one or more contextual messages superimposed on a digital image displayed via the visual display, wherein each contextual message is displayed over a respective portion of the digital image that comprises a corresponding computer readable code so as to indicate an association between the contextual message and the computer readable code, and wherein each contextual message provides a graphic representation of at least a portion of the context-sensitive data relevant to the user.

16. A mobile computing device comprising:

a user-interface (UI) system comprising (i) at least one input sensor for capturing input information comprising a computer recognizable object and user behavior information; and (ii) a visual display with a touch screen for displaying images comprising real-time video images of a field of view of the at least one input sensor and generating touch information in response to a touch;

a memory for storing a local data cognition layer (DCL) software program;

a communication module for facilitating communication between the mobile computing device and a cloud data cognition layer (DCL) software program executed by a remote computing device connected to the mobile computing device via a network, the cloud DCL software program comprising first and second software plug-ins; and a processor connected to the UI system, the memory, and the communication module, the processor configured to execute the local DCL software program to: (i) receive the input information comprising the computer recognizable object and the user behavior information from the UI system's at least one input sensor and the touch information from the touch screen, wherein the computer recognizable object comprises a barcode, (ii) filter the barcode through each of the first software plug-in and the second software plug-in to determine a type of the barcode recognized in the input information and to determine if at least one of the first software plug-in or the second software plug-in is capable of acting on the determined type of the barcode, wherein the acting on the determined type of barcode comprises performing a task specific to at least one of the first software plug-in or the second software plug-in, and wherein the first software plug-in is configured to recognize a first type of barcode data and the second software plug-in is configured to recognize a second type of barcode data, (iii) transform the received input information into information elements, (iv) communicate the input information and the touch information to the cloud DCL software program via the communication module, (v) receive one or more contextual messages from the cloud DCL software program via the communication module, the one or more contextual messages being context-sensitive data relevant to a user at that time, with the relevance of the context-sensitive data being determined from the touch information and the input information comprising the at least one computer, recognizable object and the user behavior information, comprising recognizing different arrangements of the input information and the touch information as a unique context, and (vi) transmit the one or more contextual messages to the UI system's visual display;

wherein for each software plug-in of the first and second software plug-ins, the software plug-in comprises context data defining a context for the software plug-in, and wherein each software plug-in is configured to:

process the input information to determine whether the software plug-in is applicable, and render its own user interface (UI) which is overlaid on a digital image being displayed on the visual display to provide additional information associated with at least one contextual message of the one or more contextual messages in response to the software plug-in being applicable and in response to detection of user input issued by the user for the at least one contextual message, comprising the at least one contextual message being a just-in-time contextual message that is custom tailored based upon the software plug-in, and wherein there are differences between the first and second software plug-ins, the differences comprising the context data defining the context for the first software plug-in being different from the context data defining the context for the second software plug-in, and the just-in-time contextual message custom tailored based on the first software plug-in being different from the just-in-time contextual message custom tailored based on the second software plug-in.

17. The mobile computing device according to claim 16, wherein the at least one input sensor comprises a digital camera and the input information further comprises a video stream of real-time images of the digital camera's field of view.

* * * * *